United States Patent [19]

Teasdale

[11] 4,056,472
[45] Nov. 1, 1977

[54] OIL RECOVERY APPARATUS

[75] Inventor: Raymond Geoffrey Teasdale, Waterlooville, England

[73] Assignee: National Research Development Corporation, London, England

[21] Appl. No.: 666,321

[22] Filed: Mar. 12, 1976

[30] Foreign Application Priority Data

Mar. 13, 1975 United Kingdom ............... 10602/75
June 18, 1975 United Kingdom ............... 26022/75

[51] Int. Cl.² ............................................. E02B 15/04
[52] U.S. Cl. ......................... 210/242 S; 210/DIG. 25
[58] Field of Search ................. 210/83, 242, DIG. 25, 210/61-1 F

[56] References Cited

U.S. PATENT DOCUMENTS

| 2,330,508 | 9/1943 | McColl | 210/242 |
|---|---|---|---|
| 3,615,017 | 10/1971 | Valdespino | 210/242 |
| 3,662,891 | 5/1972 | Headrick | 210/242 |
| 3,662,892 | 5/1972 | Sorensen | 210/DIG. 25 |
| 3,666,099 | 5/1972 | Galicia | 210/DIG. 25 |
| 3,688,506 | 9/1972 | Marcocchio | 210/242 |
| 3,710,943 | 1/1973 | Davidson et al. | 210/242 |
| 3,715,034 | 2/1973 | Ivanoff | 210/242 |
| 3,757,953 | 9/1973 | SkyEeagle, Jr. | 210/DIG. 25 |
| 3,771,662 | 11/1973 | Muramatsu et al. | 210/DIG. 25 |
| 3,788,481 | 1/1974 | deAngelis | 210/DIG. 25 |
| 3,796,656 | 3/1974 | Arey | 210/242 |
| 3,804,251 | 4/1974 | Farrell et al. | 210/DIG. 25 |
| 3,822,789 | 7/1974 | Crisafulli | 210/DIG. 25 |
| 3,860,519 | 1/1975 | Weatherfurl | 210/242 |
| 3,966,614 | 6/1976 | Ayers | 210/DIG. 25 |

Primary Examiner—Theodore A. Granger
Attorney, Agent, or Firm—Cameron, Kerkam, Sutton, Stowell & Stowell

[57] ABSTRACT

An oil recovery apparatus in which oil to be recovered is allowed to pass over the leading weir edge of an oil skimmer mounted transversely across a flotation platform and with the leading weir edge positioned in the region of the center of buoyancy of the flotation platform. Oil passing over the leading weir edge is sucked through a slotted flow equalizing baffle plate mounted within the oil skimmer and removed to a collection location or vessel.

12 Claims, 8 Drawing Figures

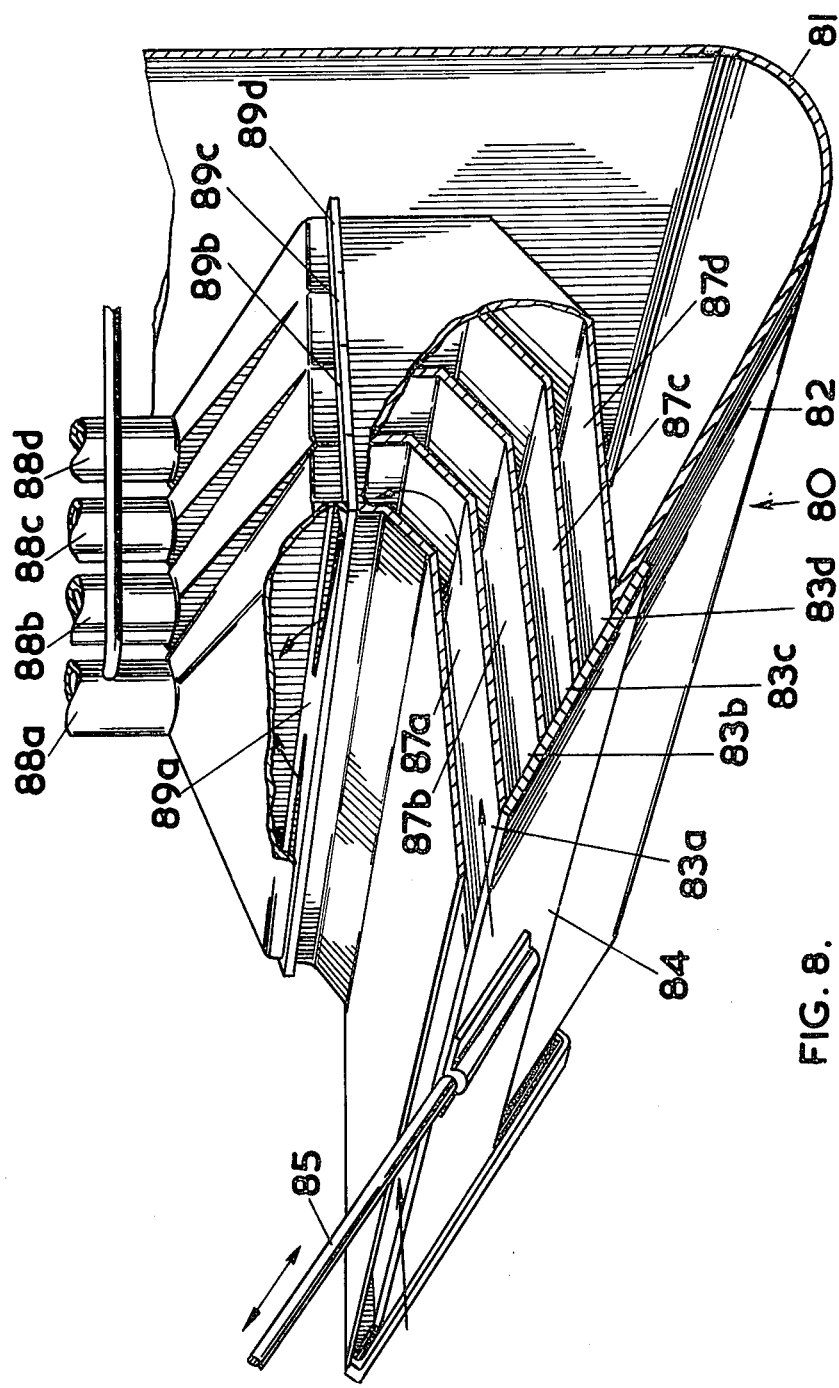

OIL RECOVERY APPARATUS

This invention relates to the recovery of oil from a liquid and in particular to the bulk recovery of spilled oil from the sea. More particularly but not exclusively the invention relates to a method and apparatus for concentrating a relatively large surface area thin film of oil into a relatively small surface area thick narrow layer of oil and subsequently recovering the oil layer with a novel form of oil recovery apparatus.

The hazards and problems associated with accidential oil spills are well known and many systems have been devised for containing and controlling the spread of such oil spills by means of towed or tethered booms. Once the oil spill has been contained it then becomes necessary to recover the oil from within the boom enclosed area and known arrangements include simple weir systems, belt and disc skimmer systems and oil absorbent fibrous materials. One of the most common and older techniques of separating oil from water is passing the floating oil over a dam or weir and during the past decade many attempts have been made to adapt the technique to the recover of spilled oil. These attempts have not been completely successful for the following reasons:- a. A weir embodied within a watercraft is affected by any roll or pitching of the craft in a seaway.

b. The relative thinness of the oil film when related to wave disturbance of the sea's surface layer; an increase in wave height above zero rapidly increases the percentage of water recovered over the weir.

c. Attempts to store recovered fluids aboard the craft containing the weir give rise to problems of continually changing trim, the consequent variation of weir lip immersion.

It is an object of the present invention to provide an efficient recovery system embodying the basic weir principles and which is comparatively inexpensive to produce whilst offering a highly competitive rate of oil recovery.

Conventional boom oil entrapment systems tend, by virture of their design, merely to contain the oil slick within the booms which assume a natural arcuate form — usually of 'U' or substantially 'O' form. Such systems are designed to prevent further spreading of the oil and do not set out to concentrate the oil slick into a smaller area and thereby to increase the thickness or depth of the oil layer.

Applicant has designed a boom system in the general form of an open Y, the converging booms of the top of the Y being maintained substantially straight by the discrete positioning of tie-pendents connected across and between the arms. In use the booms are towed towards the oil slide which enters at the top end of the Y and passes between the booms, being concentrated by the forward motion of the converging booms. Oil thickening is thus achieved and in a particular design in which the distance between the booms forming the bottom of the Y is one thirtieth of the initial entry width a typical 1 mm film of oil is concentrated to a 30 mm thick layer at the single leg of the Y. It will be seen therefore that with this boom layout a useful depth of oil may be fed between the booms forming the lower leg of the Y directly into an oil recovery device.

According to the present invention an oil recovery apparatus comprises a flotation platform containing an oil skimmer in the general form of a simple weir, the oil skimmer being mounted transversely across the platform in the region of the centre of buoyancy whereby in use vertical motion of the skimmer due to pitching of the platform is minimised. Preferably the flotation platform comprises twin hulls separated by a central bridge structure depending down between the hulls to the load water line of the platform and with the oil skimmer mounted between the hulls and in the region of the centre of buoyancy of the platform. Advantageously the lower fore region at least of the central bridge structure is inclined upwardly and forwardly from a position on the load water line of the floatation platform a short distance forward of the oil skimmer whereby disturbance of the surface oil layer is minimised at the point of operation of the oil skimmer.

The surface of the lower fore region of the central bridge structure is preferably in the form of a shock absorbent cushion which in one arrangement might conveniently comprise a layer of foam or like material protected and reinforced on its exposed side by a polyvinylchloride or like membrane or skin which in use will also minimise friction between the underside of the central bridge structure and the surface oil layer.

Alternatively, the fore and aft regions may be of convex arcuate form extending towards each other tangentially of the load water line. This alternative arrangement is less preferably other than in very calm water since it has been found that, in certain circumstances, the curved underside forward of the oil skimmer has a tendency to pound the surface oil layer and cause globulation of the oil, the pounding imparting a downward motion to these oil globules causing some of them to pass beneath the oil skimmer and thereby avoid direct recovery.

The oil skimmer includes a leading weir edge adjustably mounted relative to the underside of the central bridge structure, there being means provided whereby the leading weir edge may be lowered relative to the underside of the bridge structure to allow in use passage of oil over the leading weir edge, the oil skimmer also including collection means whereby in use the recovered oil may be transferred to a convenient location or collection vessel.

A first embodiment oil skimmer comprises essentially a receptable-like open scoop or scuttle structure having a substantially vertical forward facing weir member, the upper horizontal edge of which forms the leading weir edge over which the oil to be recovered is allowed to pass. The oil skimmer may conveniently be pivotally mounted between the twin hulls of the flotation platform in the region of the centre of buoyancy of the flotation platform and the means for adjusting the leading weir edge of the skimmer relative to the underside of the central bridge structure may simply be the controlled rotation of the oil skimmer about its pivotal mounting.

Means for removing the oil recovered by the oil skimmer of the first embodiment may be a suction evacuation passageway or conduit extending from the lower region of the oil skimmer structure. To equalise the flow of oil across the width of the leading weir edge and into the oil skimmer structure, an internal baffle plate may, with advantage, be fitted within the oil skimmer structure, the baffle plate being slotted to allow passage of the recovered oil from above the weir edge into the lower portion of the skimmer from where it can be removed. Preferably, the cross-sectional area of the slots in the internal baffle plate match in area the evacuation passageway; and in a simple design the baffle plate has two such slots, each of which is tapered and extends from the central region of the plate in a direction parallel with the leading weir edge of the oil skimmer, the slots widening as they extend away from the central region. With this arrangement, a substantially uniform evacuation across the full width of the upper chamber of the oil skimmer can be achieved.

A second embodiment oil skimmer includes a sharp leading weir edge with no corresponding substantially vertical forward facing weir member. The sharp leading weir edge is adjustably mounted relative to the underside of the central bridge structure, and the oil skimmer, like that of the first embodiment, comprises essentially an open scoop or scuttle like structure which in use is arranged to receive the oil to be recovered as it passes over the sharp leading weir edge. Once over the sharp leading weir edge, however, the oil to be recovered flows over a ramp-like surface and into a transversely provided trough from where it passes into the lower region of the oil skimmer scoop to be removed via a suction evacuation passageway extending conveniently from the upper region of the oil skimmer structure. To equalise the evacuation of oil across the width of the oil skimmer, there is provided an internal baffle plate of similar design to that of the first embodiment and mounted within the oil skimmer to separate the lower and upper regions of the oil skimmer.

A third and preferred embodiment oil skimmer comprises a fixed structure in the general form of a scoop or scuttle which protrudes downwardly from the load water line, the fixed structure including at least one forward facing oil extraction passageway extending substantially the full width of the fixed structure, the oil skimmer also comprising a weir plate member mounted immediately upstream of and parallel to the open end of the oil extraction passageway and slideably adjustable relative to the underside of the central bridge structure to be lowered and raised across the open end of the oil extraction passageway to vary the depth of the passageway to be exposed.

The fixed structure of the oil skimmer is advantageously provided with a series of separate forward facing oil extraction passageways each extending substantially the full width of the fixed structure and arranged one above the other such that as the weir plate member is lowered progressively from a position at the load water line, the separate oil extraction passageways are successively uncovered. Each oil extraction passageway is provided with a slotted flow equalising baffle plate and is in fluid connection with a suction evaculation passageway whereby in operation oil entering the open end of the oil extraction passageway after passing over the upper leading edge of the weir plate member is sucked along the passageway through the slotted flow equalising baffle plate and into the oil suction evacuation passageway from where it is passed to the collection vessel.

The weir plate member conveniently may be mounted at its end regions in guide members located in the fixed oil skimmer structure or in the inner side walls of the twin hulls of the flotation platform, and lowering and raising of the weir plate member might be by means of, for example, a control rod attached at one end to the weir plate member and operable from the other end by a hand vessel via, for example, a rack and pinion mechanism.

A further feature of the invention is the provision of at least one small floating oil skimmer positioned to the rear of the main oil skimmer and arranged to suck off any globules of oil which escape under the main oil skimmer and rise to sit on top of the vortex generated by and positioned behind the main oil skimmer. It is suspected that "diving" globules of oil cannot be entirely prevented since it is thought that they are inherent in the effect of waves on an oil slick at sea. Conveniently and preferably each additional floating oil skimmer employs a suction feed from a suction source serving the main oil skimmer; the oil globules thus recovered are passed with the main body of recovered oil to the collection vessel.

Apparatus for use in the recovery of oil from the surface of a body of water comprises in combination a boom system of substantially Y-plan form arranged to entrap and progressively concentrate the oil to be recovered as it passes between the converging arms of the boom system, an oil recovery apparatus of the type hereinbefore described connected to the bottom end of the Y-boom system and adapted to receive the concentrated oil and recover the same by means of the oil skimmer and despatch it to a collection vessel. In a preferred arrangement of the apparatus for use in the recovery of oil from the surface of a body of water, the open ends of the Y-boom system are towed by tugs or other like marine craft, one of which also tows an oil collection tanker positioned approximately abeam of the oil recovery apparatus and into which oil recovered by the oil skimmer is pumped via a buoy supported delivery hose.

Several embodiments of the invention will now be described by way of example only and with reference to the accompanying diagramatic drawings in which:-

FIG. 8 is a schematic perspective view, partially broken away view of the third embodiment of oil skimmer as shown in FIG. 7.

Figure 1:
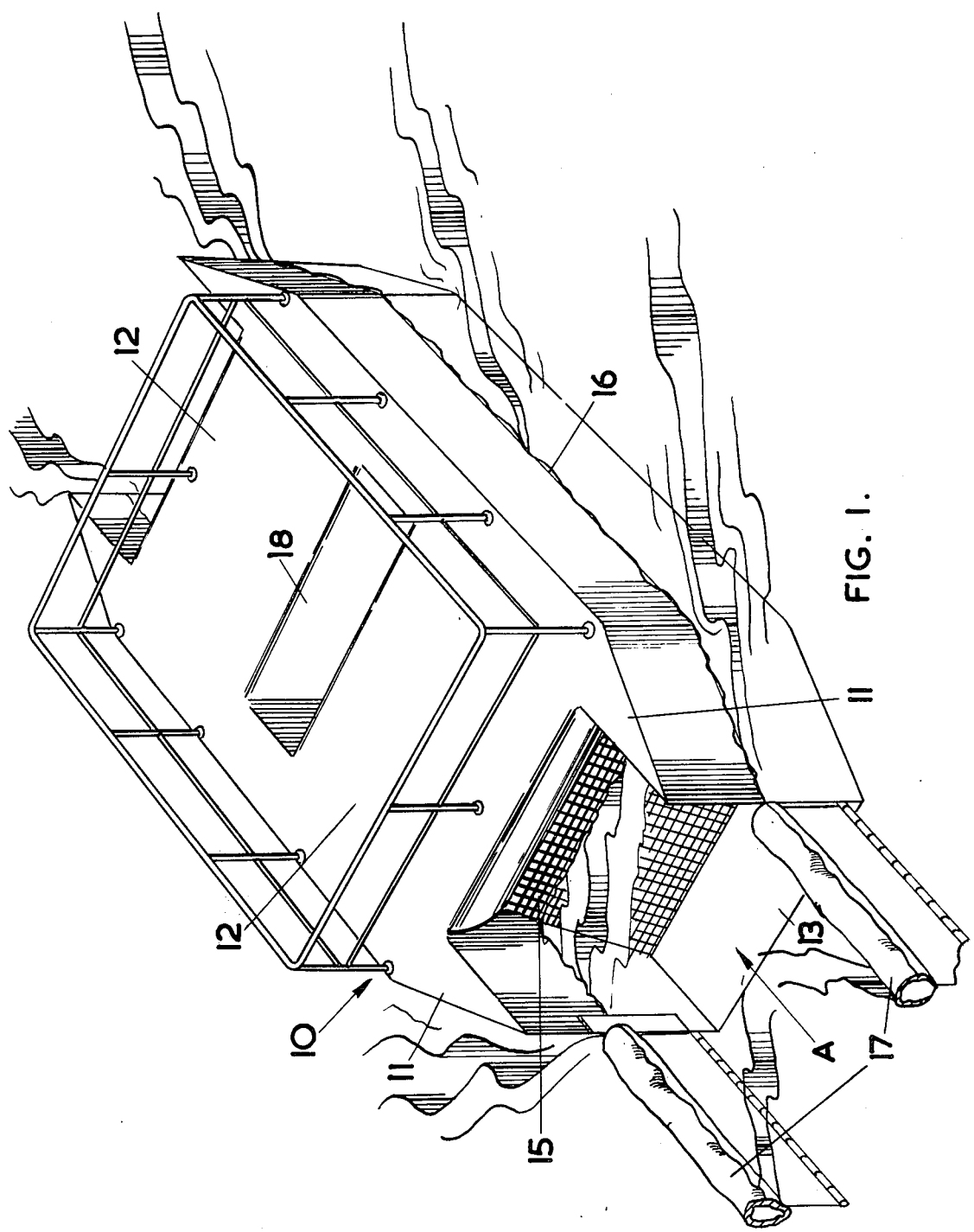
FIG. 1 is a general perspective view of a prototype oil recovery flotation platform of the invention.

Referring to FIG. 1, the flotation platform 10 comprises twin hulls 11, and a connection bridge structure 12. A horizontally disposed fore plane 13 connects the lower forward surfaces of the hulls 11. A similar rear plane 14 (see FIG. 2) is disposed at the aft of the platform 10. A trash grid 15 is positioned between the bridge structure 12 and the fore plane 13 and the load water line of the platform 10 is indicated by the line 16.

Attached to the forward ends of the hulls 11 are booms 17 from an oil collection and concentrations Y-form boom system and the arrow 'A' indicates the direction of the concentrated oil as it would flow through the oil recovery flotation platform 10. A central well 18 is provided in the bridge structure 12 for the insertion of an oil skimmer 20 (refer FIG. 2).

Figure 2:
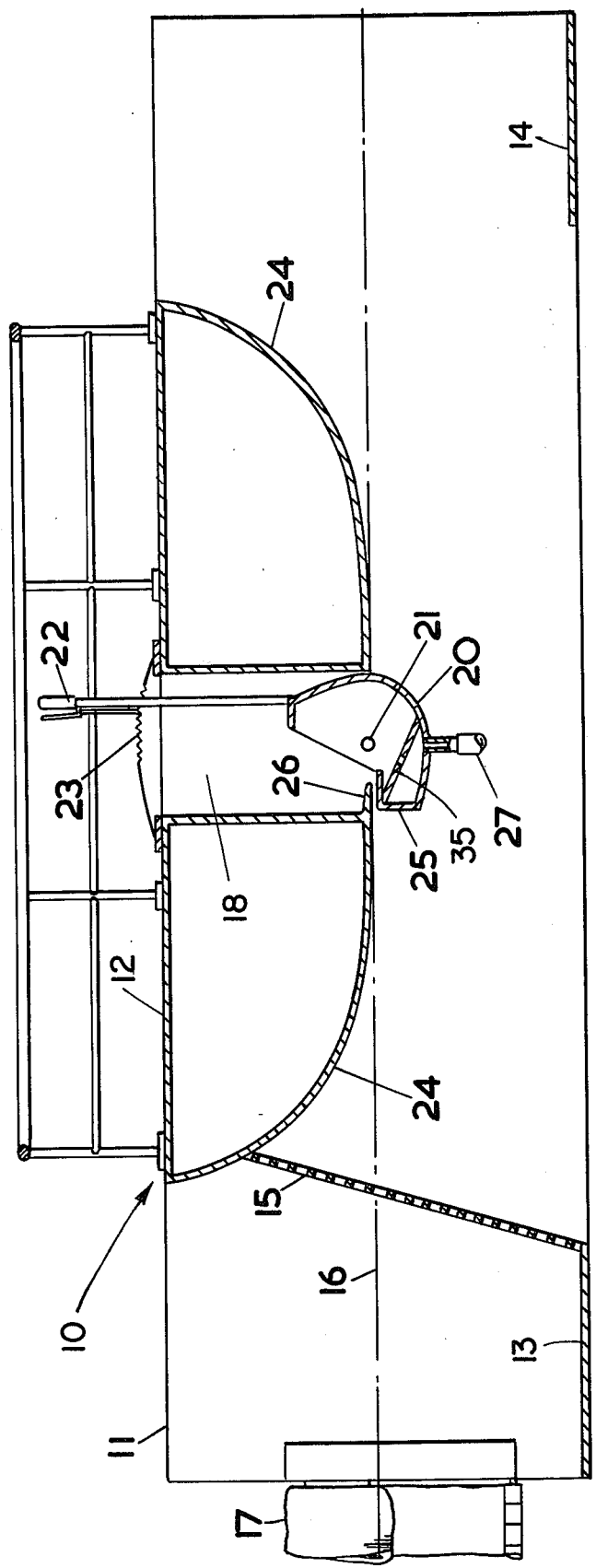
FIG. 2 is a longitudinal section through the prototype flotation platform of FIG. 1 showing the location of a first embodiment oil skimmer.

Referring now to FIG. 2, there is shown an oil skimmer 20 in accordance with a first embodiment positioned transversely of the longitudinal axis of the platform 10 in the region of the centre of buoyancy of the platform 10. The oil skimmer 20 is pivotally connected to the hulls 11 on the axis 21 and is rotatable about that axis by means of a simple depth control lever 22 engageable with a position rack 23. It will be noted that the control lever 22 passes through the central well 18 in the bridge structure 12.

The bridge structure 12 is essentially in two parts, each of which depends between the hulls 11 to the load water line 16 in the region of the central well 18 from the under-surface of the bridge structure 12 curves upwardly to create watertight compartments in which might be stored, for example, pump or other ancillary equipment. The main purpose of the curved under-surface of the bridge structure 12 is to suppress any wave movement in the region of the oil skimmer 20.

The oil skimmer 20 will be described in more detail with respect to FIG. 3 but it is important here to note that it has a forward facing weir face 25, the upper edge of which may abut against an extension 26 of the curved forward under-surface 24 of the bridge structure 12.

Figure 4:
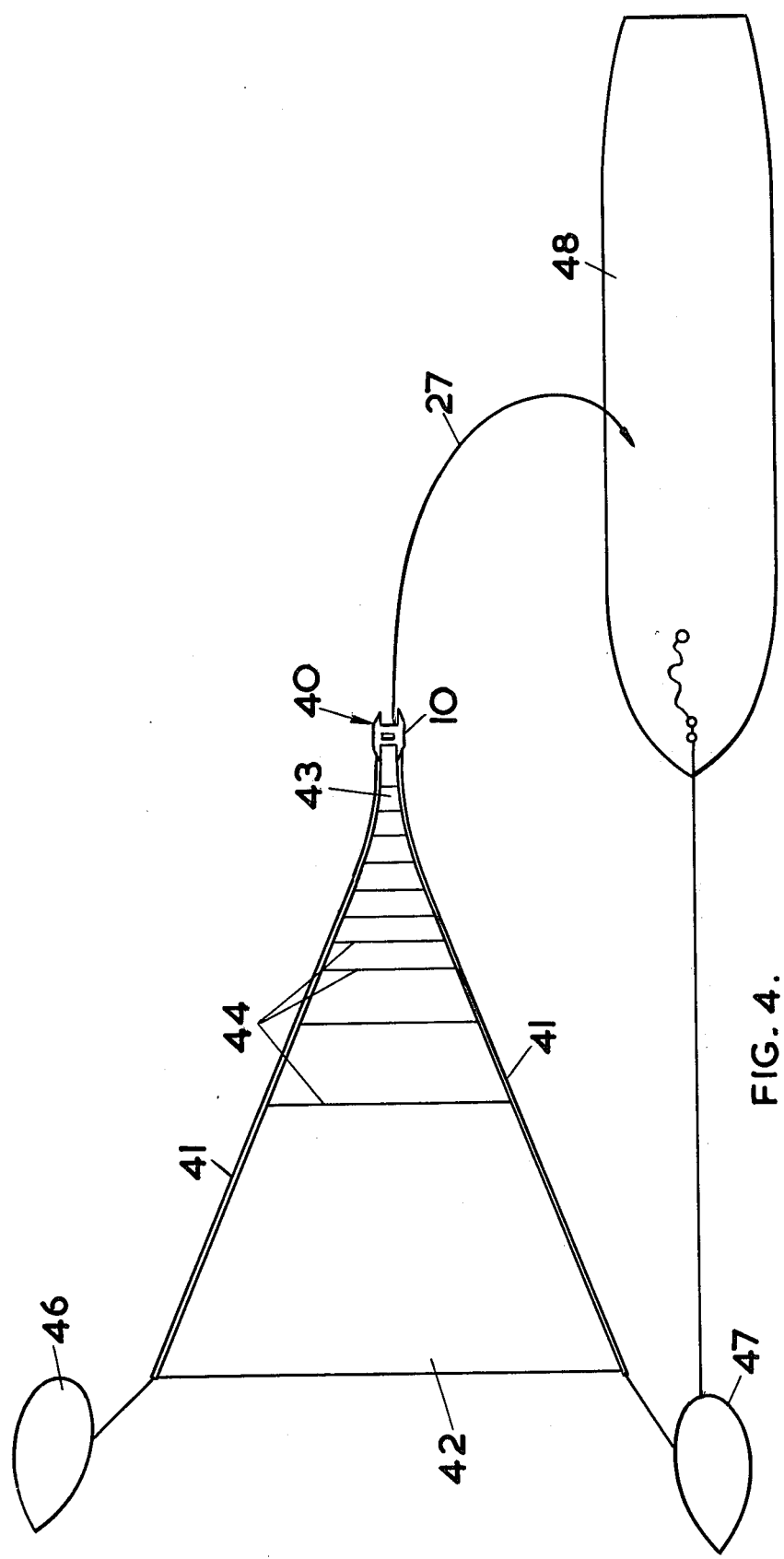
FIG. 4 is a layout of a preferred complete oil recovery system incorporating an oil recovery apparatus of the invention.

Attached to the lower portion of the oil skimmer 20 is a suction evacuation passageway 27 which feeds the recovered oil to an oil collection location (oil collection tanker 48 of FIG. 4).

Figure 3:
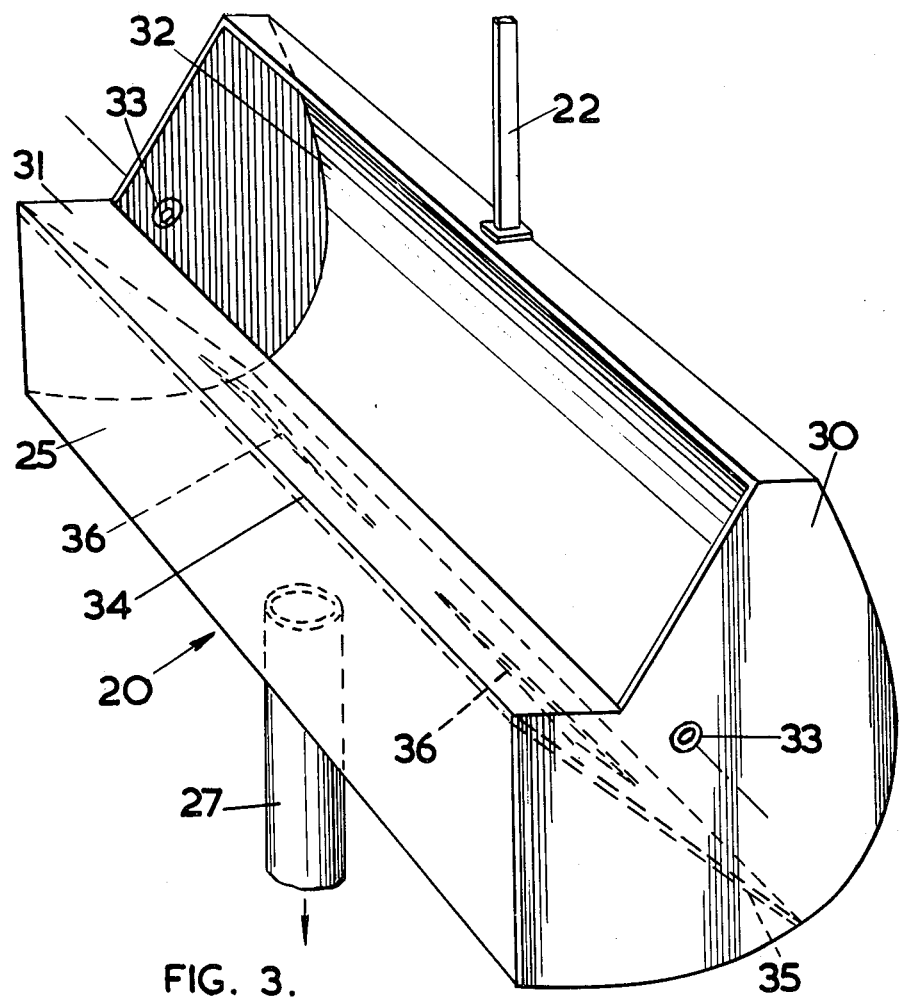
FIG. 3 is a general perspective view of the oil skimmer of FIG. 2.

FIG. 3 shows the oil skimmer 20 in the form of an open scoop or scuttle having flat forward facing weir face 25 flat end members 30 flat top weir face 31 and a curved back member 32. The flat end members 30 include pivot points 33 by which the oil skimmer 20 is positioned in the flotation platform 10 on the axis 21 as was described with reference to FIG. 2. The junction of the substantially vertical weir face 25 and the substantially horizontal top face 31 constitutes a leading weir lip edge 34 over which oil is allowed to pass during the recovery operation. In use of the oil being recovered passes over the leading weir lip edge 34, over the top weir face 31 and into the hollow interior of the oil skimmer 20 from where it is extracted by means of the centrally located suction evacuation passageway 27.

Mounted within the hollow interior of the oil skimmer 20 is an internal baffle plate 35 containing two tapered slots 36 extending longitudinally of the oil skimmer 20 and increasing in width from the central region of the oil skimmer 20. The cross-sectional area of the tapered slots 36 is matched with that of the suction evacuation passageway 27, the actual geometry of the tapered slots 36 being designed so as to give substantially even suction flow rate over the full width of the oil skimmer 20 during use. The suction generated in the lower chamber of the oil skimmer 20 beneath the baffle plate 35 arises from an induced flow pump sucking through the suction evacuation passageway 27.

The control lever 22 by which the rotational position of the oil skimmer 20 is determined is located centrally of the oil skimmer 20.

FIG. 4 shows a preferred layout of an complete oil recovery system incorporating an oil recovery apparatus of the kind previously described with reference to FIGS. 1, 2 and 3 or as described below with reference to FIGS. 5 and 6 or FIGS. 7 and 8. An oil recovery apparatus 40 is towed behind a Y-plan-form boom system comprising boom members 41 which converge from their open-end 42 to their relatively closed end 43 where they are attached to the platform of the oil recovery apparatus 40 (compare, for example, FIG. 1 and booms 17). The Y-plan-form is maintained mainly by means of tie-pendants 44 connected between the boom members 41. It will be noted that although the 'open' areas of the Y-plan-form booms are straight the booms 41 curve into the platform of the oil recovery apparatus 40.

The Y-plan-form boom system is towed in conventional manner by tugs 46 and 47, tug 47 also towing an oil collection tanker 48 into which oil recovered from the oil recovery apparatus 40 is pumped via the suction evacuation passageway 27. A desirable feature of this general arrangement is that only two powered craft, ie the tugs 46 and 47, are required and the delivery of the recovered oil from the oil recovery apparatus 40 to the oil collection tanker 48 is from the rear of the oil recovery apparatus 40 via a buoy supported delivery hose; this has been shown as being the most efficient mode.

A description of the operation and use of the oil recovery apparatus of the invention will now be described with reference generally to each of the FIGS. 1, 2, 3 and 4. The oil skimmer 20 is mounted in the well 18 of the flotation platform 10 in the manner shown in FIG. 2, there being provided rubber sealing (not shown) between the vertical end members 30 of the oil skimmer 20 and the ends of the well 18 to minimise leakage of oil. The oil skimmer 20 is located initially with the top weir face 31 and leading weir lip edge 34 abutting the under side of the extension 26 to the lower forward curved under-surface 24.

The complete recovery system as shown in FIG. 4 is towed towards the oil slick to be recovered, the direction of approach to the oil slick being preferably one in which the oil skimmer 20 will operate with its forward facing weir face 25 parallel to the waves, either into-sea or down-sea. The oil enters the open end of the Y-plan-form boom system and is concentrated towards the relatively closed end 43 from where it is fed into the oil recovery apparatus 40. Since the central bridge structure 12 of the flotation platform 10 depends to the load water line any waves present in the region of the platform 10 will be suppressed; the presence of a relatively thick layer of oil on the surface of the water will itself also aid in wave suppression. Pitching of the platform 10 is minimised by means of the fore plane 12 and the after plane 14, and since the oil skimmer 20 is located in the region of the centre of buoyancy of the platform 10 there is very little relative motion between the leading weir lip edge 34 and the oil layer which will pass over it.

The "bite" of the oil skimmer is dictated by the vertical distance between the extension 26 on the underside of the central bridge structure 12 and the leading weir lip edge 34, this distance being controlled by an operator via the control lever 22 and position rack 23. In the design tested the width of the oil skimmer was 5 feet the vertical depth of the forward weir face 25 was 6 inches and the depth of cut or the bite of the skimmer was adjustable from zero to 3 inches. In use of the depth of cut is adjusted to the depth of the oil layer to be recovered in close conjunction with the towed speed of the apparatus and the suction pump capacity. With the dimension given, an operating speed of 1½ knots and a 3 inch cut would require a pump capacity of about 200 tons/hour to keep the oil skimmer 20 chamber activated. The suction pump was of the induced flow type and for convenience can be mounted within the watertight compartment of the central bridge structure 12. Oil passing over the leading weir lip edge 34 is sucked through the tapered slots 36 in the baffle plate 35 and through the extraction hose 27 and delivered into the oil collection tanker 48. An operator enclosed cabin may conventionally be provided on the central bridge structure 12.

Whereas the channel-way through which the concentrated layer of oil is fed from the boom system may convenitenly be formed between the twin hulls of the flotation platform, it will be appreciated that such a channel-way is not so limited and could, for example, be formed by means of a pair of longitudinally extending vertical plates suspended intermediate of the twin hulls.

It will be understood that the above described operation, although described relative to the flotation platform 10 and the oil skimmer 20 of FIGS. 1 to 3, also applies generally to operation with the flotation platform 50 and oil skimmers 56 and 80 of FIGS. 5 to 8.

During trial of the prototype flotation platform 10 of the invention, it was found that in certain sea conditions, the shaped forward underside 24 of the central bridge structure 12 tended to pound the surface oil layer ahead of the oil skimmer and cause globulation of the oil. The force of this pounding imparted a downward motion to the oil globules causing some of them to pass beneath the oil skimmer and thereby avoid direct recovery. To overcome this problem, an improved flotation platform and a second embodiment oil skimmer resulted primarily in the re-design of the forward shaped underside of the central bridge structure and of the oil skimmer structure itself.

Figure 5:
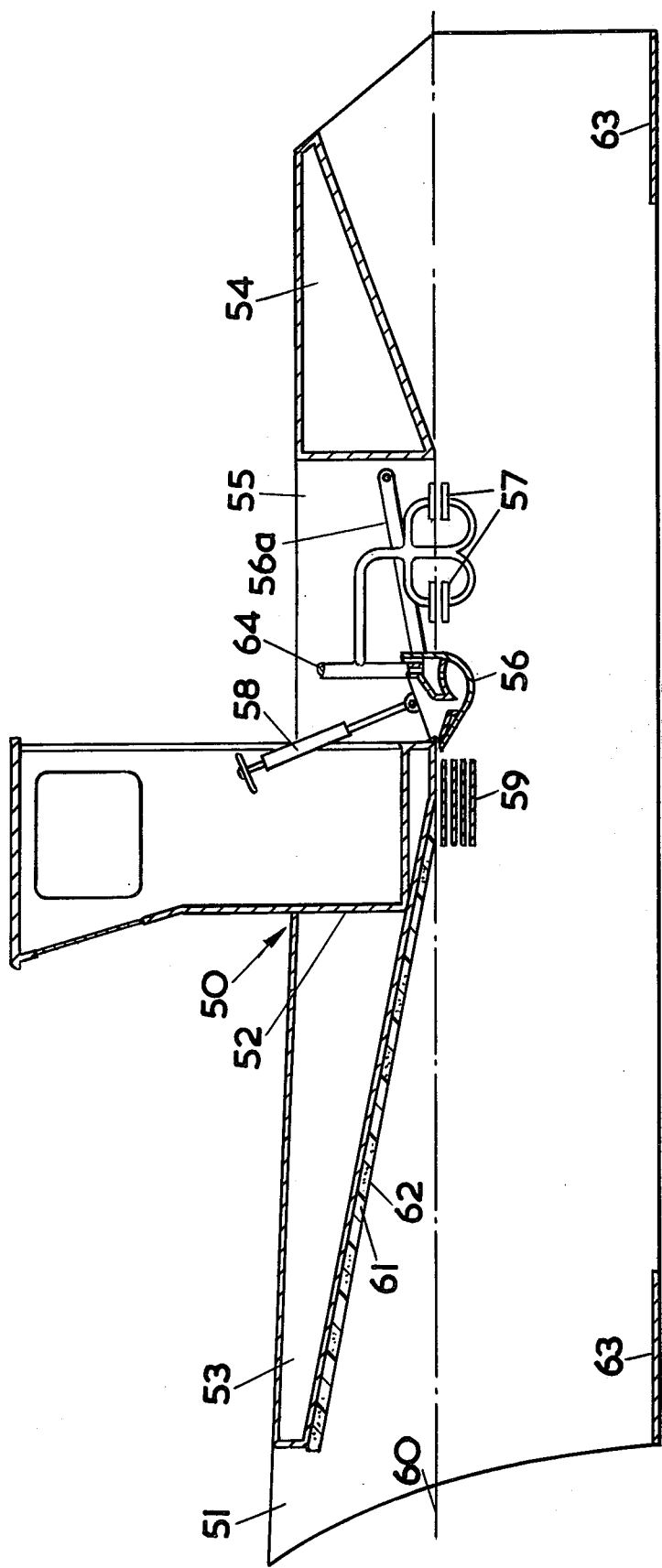
FIG. 5 is a longitudinal section through an improved oil recovery flotation platform of the invention and corresponds broadly with FIG. 2.
Figure 6:
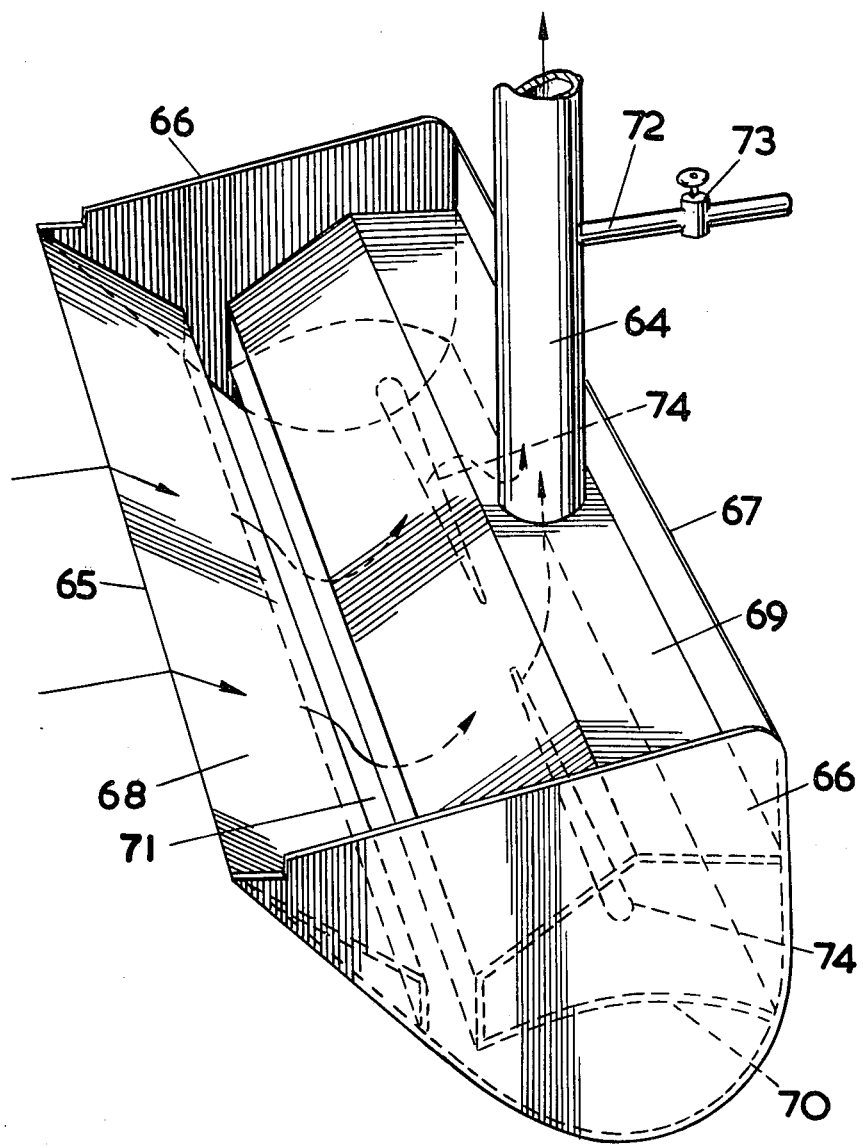
FIG. 6 is a general perspective view of a second embodiment oil skimmer and as shown in FIG. 5.

The improved flotation platform and oil skimmer is now described relative to FIGS. 5 and 6 in which a flotation platform 50 comprises twin hulls 51 (only one of which is shown) and a connecting bridge structure 52.

The bridge structure 52 includes a forward portion 53 and an aft portion 54. A central well area 55 contains an oil skimmer 56 of a second embodiment and additional floating oil skimmers 57.

The oil skimmer 56 is pivotally connected between the hulls 51 on pivot arms 56a so that its forward or leading weir edge (reference 65 in FIG. 6) is located in the region of the transverse centre of buoyancy axis of the flotation platform 50. The oil skimmer 56, is, in use, rotated on the pivot arms 56a by means of screw operable skim depth control means 58 operable by the controller of the flotation platform 50.

Immediately forward of the oil skimmer 56 there is provided an optional vertical bank of horizontally mounted parallel laminar flow plates 59 which extend transversely across the flotation platform 50 and serve in use to direct the concentrated surface oil layer to the oil skimmer 56.

The lower surfaces of the forward and aft bridge portions 53 and 54 are inclined upwardly from the load water line of the flotation platform 50 and which is indicated by the line 60. The upwardly inclined surface of the forward bridge portion 53 which contacts the surface layer of oil is provided with a shock absorbent cushion in the form of a 2" inch thick layer of expanded foam material 61 which is protected and reinforced with a polyvinylchloride membrane 62 which also serves to minimise friction between the surface oil layer and the inclined surface of the forward bridge portion 53.

The flotation platform 50 may be provided with horizontally disposed fore and aft planes 63 which extend between the hulls 51 and which function to reduce the pitching of the flotation platform 50.

In use oil recovered by the oil skimmer 56 is extracted via a suction evacuation passage-way 64 from which the small floating oil skimmers 57 also derive their suction.

Referring now to FIG. 6 the oil skimmer 56 is shown in the general form of an open scoop or scuttle having a sharp leading weir edge 65, flat end members 66 and a generally curved bottom and back member 67.

The flat end members 66 include bracket means (not shown) by which the oil skimmer 56 is connected with the pivot arms 56a and skim depth control means 58 and by which it is positioned in the floation platform as was described with reference to FIG. 5.

Within the interior of the oil skimmer 56 is a feed-in ramp member 68 and an inner enclosure member 69 from the top of which there extends the suction evacuation passageway 64. The lower side of the innner enclosure member 69 is in the form of a baffle plate 70 which also serves to define the lower and upper regions of the oil skimmer 56. A trough 71 is formed between the feed-in ramp member 68 and the inner enclosure member 69 and extends the full width of the oil skimmer 56. A small suction extraction pipe 72 from the small floating oil skimmers 57 connects with the suction extraction pipe 64 and is controllable by means of the valve 73.

The baffle plate 70 has two tapered slots 74 which extend longitudinally of the oil skimmer 56 and increases in width from the central region of the oil skimmer 56. The cross-sectional area of the tapered slots 74 is matched with that of the suction extraction pipe 64, the actual geometry of the tapered slot 74 being designed so as to give substantially even suction flow over the full width of the oil skimmer 56 during use.

Operation of the oil recovery apparatus of FIGS. 5 and 6 is substantially identical to that described relative to FIGS. 1 to 4 other than in the following respects. A concentrated depth of oil is fed from the boom system and between the twin hulls 51 of the floation platform 50. The inclined shock absorbing lower surface 61, 62 of the forward bridge portion 53 provides, in wavy sea conditions, a relatively smooth path for the surface oil layer and the layer of foam 61 cushions any impact between the forward bridge portion 53 and the oil. The oil is then guided into the bank of laminar flow plates 59 and on into the oil skimmer 56.

The oil skimmer 56 is rotated by means of the skim depth control means 58 to the required "bite" and oil flows over the sharp leading weir edge 65, across the feed-in ramp member 68 and into the trough 71. From the trough 71 the oil passes into the lower portion of the oil skimmer 56 from where it is sucked upwardly through the tapered slots 74 in the baffle plate 70 into the upper portion of the oil skimmer 56 and through the suction evacuation passageway 64 and away to the oil collection vessel.

Any globules of oil which as a result of being impacted by the lower surface of the forward bridge portion 53 have been caused to pass under the oil skimmer 56 will be recovered via the small floating oil skimmers 57 located just aft of the oil skimmer 56.

Figure 7:
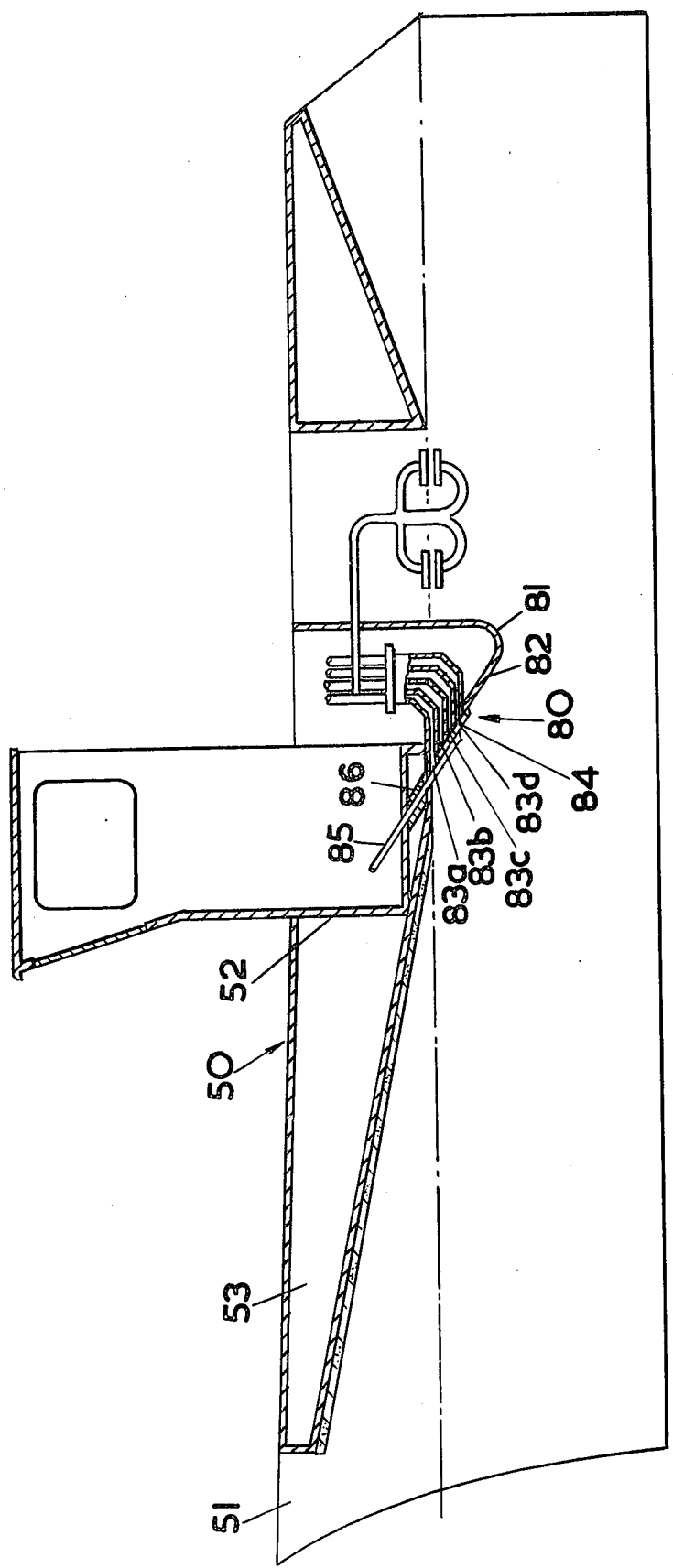
FIG. 7 is a longitudinal section through the improved oil recovery flotation platform of the invention showing a third embodiment oil skimmer and corresponds broadly with FIGS. 2 and 5.

In FIGS. 7 and 8 there is shown a flotation platform incorporating a preferred third embodiment oil skimmer structure. FIG. 7 corresponds essentially with FIG.

5 and is a longitudinal section through the improved flotation platform of the invention. Common features between the flotation platform are indicated with identical reference numerals. The only difference will be seen to be the design of the oil skimmer structure 80 (56 in FIG. 5) which here takes the form of a fixed structure scoop or scuttle like section pod 81 which protrudes downwardly from the underside of the bridge structure 52 just aft of the forward portion 53. The forward sloping surface 82 of the pod 81 is provided with a series of slots 83a, 83b, 83c and 83d, the slot 81a having its upper edge at the load water line. The slots 81a, b, c and d extend for the full width of the pod 81 between the twin hulls 51 and in use, are covered, or uncovered, by a weir plate member 84 slideably located in guide slots (not shown) in the end sides of the oil skimmer pod 81 and which is operated via a control rod 85 passing through the watertight gland 86 in the bottom of the bridge portion 53 and constituting part of the skim depth controlled means 58 (FIG. 5).

The slots 83a, b, c and d define the openings of forward facing passageways 87a, b, c and d (FIG. 8) through which in use oil is sucked to individual oil suction evacuation passageways 88a, b, c and d each provided with its own independent suction pump (not shown). To equalise the suction over the area of the passageways 87a, b, c and d, there are provided at the interface between the passageways 83a, b, c and d, and evacuation passageways 88a, b, c and d, slotted flow equalisation baffle plates 89a, b, c and d the slots of which are tapered in area in accordance with the same criteria as applied to the corresponding flow equalisation baffle plates 35 of FIG. 3 and 70 of FIG. 6.

In operation of the oil recovery apparatus of FIGS. 7 and 8, the oil layer to be recovered passes between the twin hulls 51 of the fldtation platform 50 and into the forward facing passageways 87. The weir plate member 84 is shown in FIG. 8 as covering the slots 83b, c and d but leaving open slot 83a. The oil layer in this case passes over the upper leading edge of the weir plate member 84 and through the slot 83a into the passageway 87a from where it is sucked through the flow equalisation plate 89a into the suction evacuation passageway 88a and away to the collection vessel (48 in FIG. 4).

When a thicker layer of oil is encountered, the weir plate member 84 is lowered to a predetermined level to open slot 83b and the pump (not shown) in suction evacuation passageways 88b is switched on such that the oil layer then passes over the upper leading weir edge of the weir plate member 84 and into the passageways 87a and b, through the flow equalisation baffle plates 89a and b and suction evacuation passageways 88a and b.

It will be appreciated that the number of slots opened to the oil layer to be recovered is dependent upon the depth of that oil layer, the maximum depth being handled when all four of the slots 83a, b, c and d are open. In the embodiment tested, the individual pump capacities for each suction evacuation pipe 88a, b, c or d had a capacity of 75 tons per hour such that the maximum through-put of the oil skimmer tested was 300 tons per hour. The individual suction evacuation passageways 88a, b, c and d may conveniently feed the oil into a common discharge pipe.

It is to be understood that the above described embodiments are examples only of the invention and that to the artisan skilled in the art, it would be obvious to make certain design variations whilst remaining within the broad principle of the invention.

I claim:

1. Oil recovery apparatus for collecting oil floating on the surface of a body of water, said apparatus comprising a vessel having spaced apart longitudinally extending hulls connected by a bridge structure located between the hulls and having a lower surface inclined downwardly from the front of the vessel toward its rear, the rear edge of said surface being located approximately at the mid-point of the vessel and on its load water line, oil collection means comprising a receptacle having a front wall forming a weir plate member over which oil may enter the receptacle, side walls and a closed bottom, said receptacle being mounted between said hulls in the region of the center of buoyancy of the vessel and being so constructed and arranged that the front wall thereof is located adjacent the rear edge of said bridge structure, means for removing oil from said receptacle, said means comprising an oil suction evacuation conduit, a baffle plate arranged substantially horizontally within said receptacle, spaced above the bottom thereof and having flow equalising slots therein, an open end of said conduit being located adjacent the mid-point of said baffle plate on one side thereof in fluid communication with the space within the receptacle on the other side of said baffle plate via said flow equalising slots, said slots being located in said baffle plate on opposite sides of said conduit, increasing in width toward the opposite ends of said plate and having a total open area substantially equal to that of said conduit open end, the pump means for applying suction to the opposite end of said conduit for removing liquid from said receptacle.

2. An oil recovery apparatus as claimed in claim 2 in which the oil suction evacuation conduit extends from the central region of the width of said receptacle and in which the slotted flow equalising plate includes two slots each of which is tapered and extends from the central region of the plate in a direction parallel with the front wall of the receptacle and widening as it extends away from the central region.

3. An oil recovery apparatus as claimed in claim 2 in which the lower forwardly inclined surface of the bridge structure includes an exterior layer of shock absorbent material.

4. An oil recovery apparatus as claimed in claim 3 in which the layer of shock absorbent material is protected are reinforced on its exposed side by a flexible skin membrane.

5. An oil recovery apparatus as claimed in claim 2 in which the oil collection receptacle comprises essentially an open scuttle-like structure pivotally mounted between the hulls of the vessel, the foremost region of the open scuttle-like structure constituting a leading weir edge of the receptacle, and including means for lowering said leading weir edge relative to the underside of the bridge structure by a controlled rotation of said scuttle-like structure about its pivotal mounting.

6. An oil recovery apparatus as claimed in claim 2 in which the oil collection means comprises a fixed structure in the general form of a scuttle which protrudes downwardly from the load water line, the forward structure of the scuttle including at least one forward facing oil extraction passageway extending substantially the full width of the fixed structure, the oil collection means also comprising said weir plate member mounted immediately upstream of and parallel with the open end of the oil extraction passageway and slideably adjustable relative to the underside of the bridge structure whereby in use the weir plate member may be lowered and rasied across the open end of the oil extraction passageway to vary the depth of the passageway to be exposed.

7. An oil recovery apparatus as claimed in claim 6 in which the fixed structure of the oil collection means is provided with a series of separate forward facing oil extraction passageways each extending substantially the full width of the fixed structure and arranged one above the other such that in use the separate oil extraction passageways are successively uncovered as the weir plate member is lowered progressively from an upper position at the load water line.

8. An oil recovery system for usd in the recovery of oil from the surface of a body of water comprising in combination a boom system of substantially Y-plan form arranged to entrap and progressively concentrate the oil to be recovered as it passes between the converging arms of the boom, and an oil recovery apparatus as claimed in claim 1, the oil recovery apparatus being connected to the bottom end of the Y-plan form boom system and adpated to receive the concentrated oil and recover the same by means of the oil collection means and despatch it to a collection vessel.

9. An oil recovery system as claimed in claim 8 in which the open ends of the Y-plan form boom system are towed by tug marine craft, one of which also tows an oil collection tanker positioned approximately abeam of the oil recovery apparatus and into which oil recovered by the oil collection means is pumped via a buoy supported delivery hose.

10. An oil recovery apparatus as claimed in claim 1 in which the oil collection means includes a series of separate forward facing oil extraction passageways each extending substantially the full width of the oil collection receptacle and arranged one above the other, and said weir plate member being mounted immediately upstream of and parallel with the open ends of the oil extraction passageways and slidably adjustable relative to the underside of the bridge structure whereby in use the weir plate member is lowered and raised across the open ends of the oil extraction passageways so that the separate oil extraction passageways are successively uncovered or covered, as required.

11. An oil recovery apparatus as claimed in claim 10 in which the oil collection means includes a series of oil suction evacuation conduits each in fluid connection with a respective separate forward facing oil extraction passageway through a slotted flow equalising baffle plate as defined in claim 1.

12. An oil recovery apparatus as claimed in claim 11 in which each oil suction evacuation conduit extends from the central region of the width of the oil collection receptacle and in which each slotted flow equalising plate includes two slots each of which is tapered and extends from the central region of the plate in a direction parallel with the open end of the oil extraction passageway and widens as it extends away from the central region.

* * * * *